P. A. CUENOT.
TESTING MACHINE.
APPLICATION FILED APR. 13, 1909.

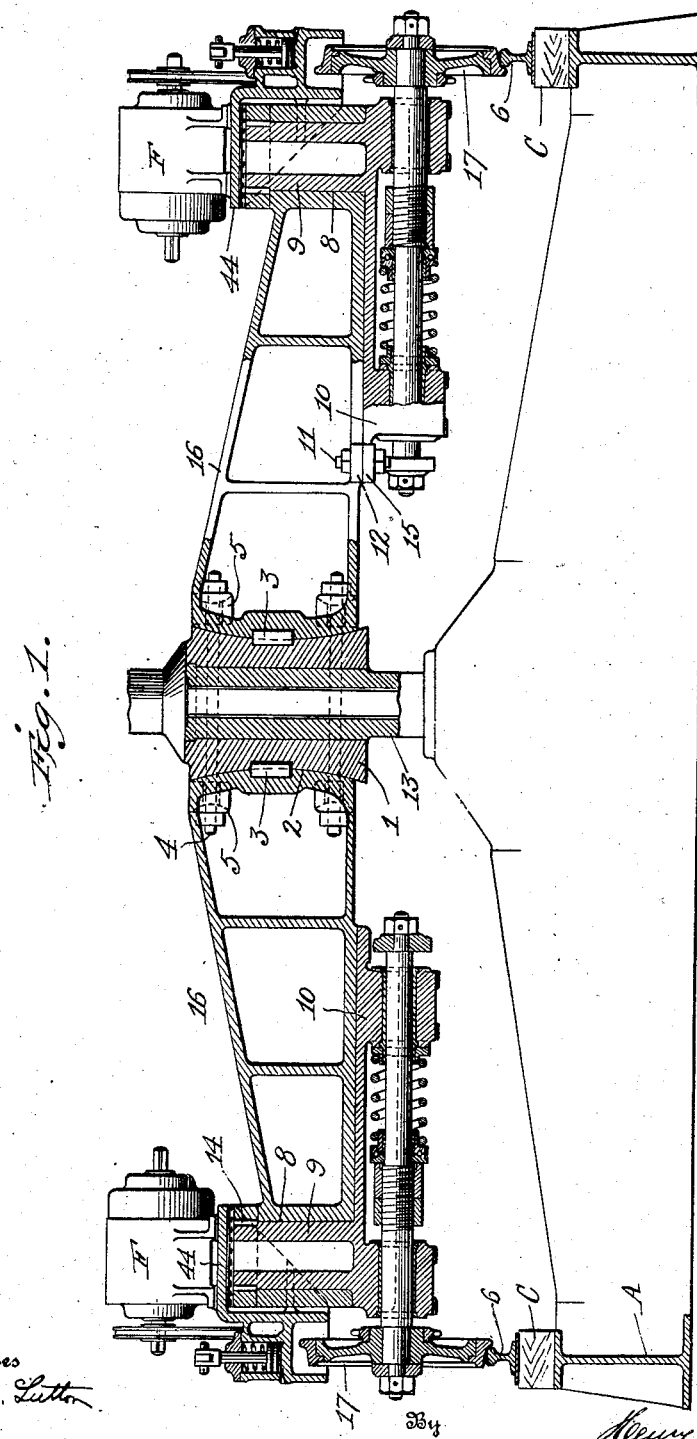

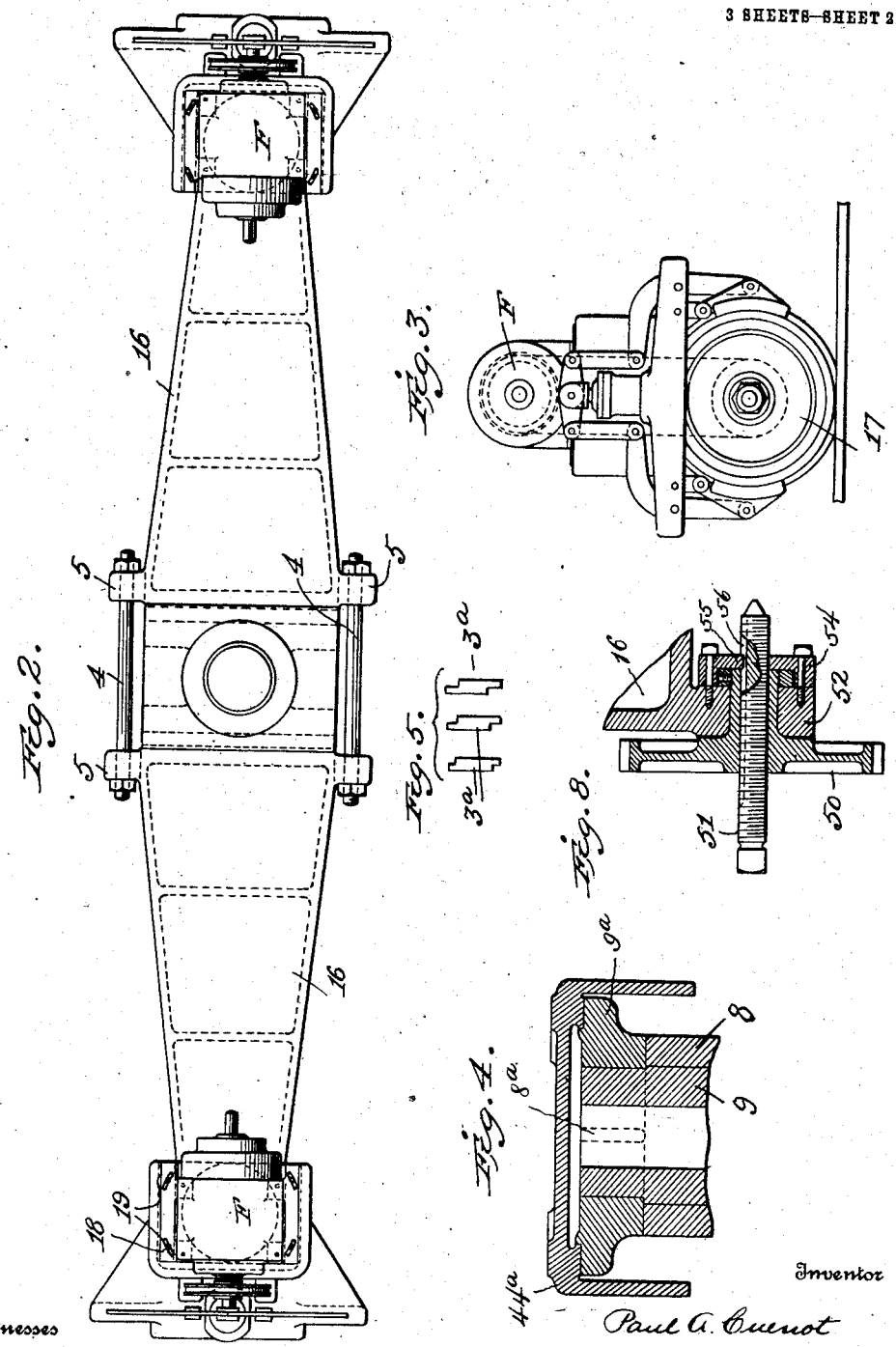

973,858.

Patented Oct. 25, 1910.
3 SHEETS—SHEET 3.

Witnesses
Jesse N. Lutton
R. V. Sommers

Inventor
Paul A. Cuenot
By
Henry Orth
Attorney

THE NORRIS PETERS CO., WASHINGTON, D. C.

UNITED STATES PATENT OFFICE.

PAUL A. CUENOT, OF STEELTON, PENNSYLVANIA, ASSIGNOR TO THE PENNSYLVANIA STEEL COMPANY, OF PHILADELPHIA, PENNSYLVANIA, A CORPORATION OF PENNSYLVANIA.

TESTING-MACHINE.

973,858.  Specification of Letters Patent.  Patented Oct. 25, 1910.

Application filed April 13, 1909. Serial No. 489,620.

*To all whom it may concern:*

Be it known that I, PAUL A. CUENOT, a citizen of the United States, residing at Steelton, in the county of Dauphin and State of Pennsylvania, United States of America, have invented certain new and useful Improvements in Testing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to rail testing machines, and has for its object to improve the construction and operation of known machines of a similar character.

To this end the invention consists of a support for carrying the car wheels and means for adjusting the supporting arm in a vertical arc, and means to permit the wheels to be swung at an angle or moved in a horizontal arc with respect to the support, whereby the tread or flange of the wheel may engage the rail under additional service conditions, which is not possible in existing machines.

The invention consists in details of construction and combination and arrangement of parts, as hereinafter more particularly set forth and then specified in the claims.

Figure 6:
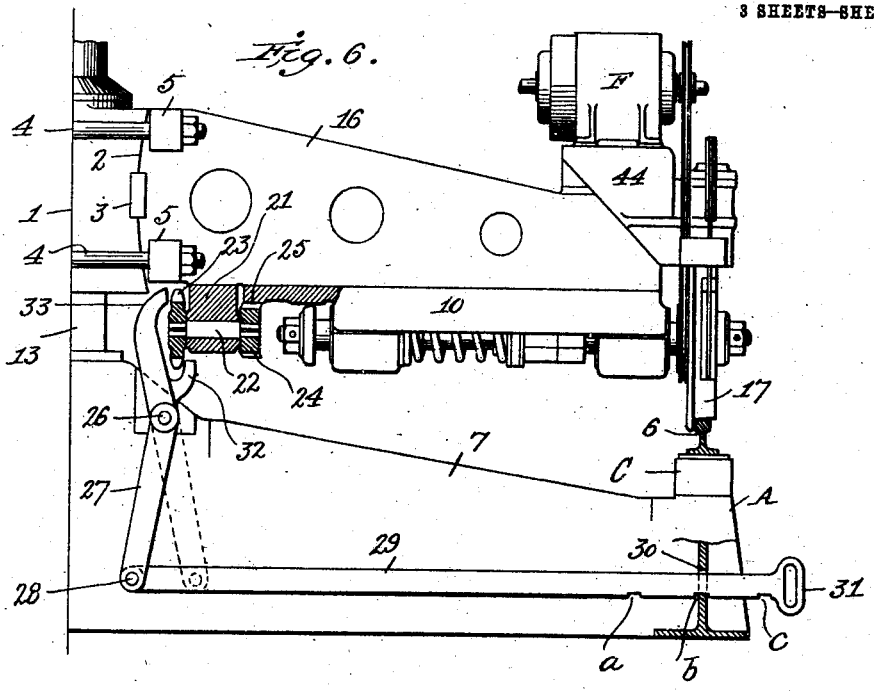
Figure 7:
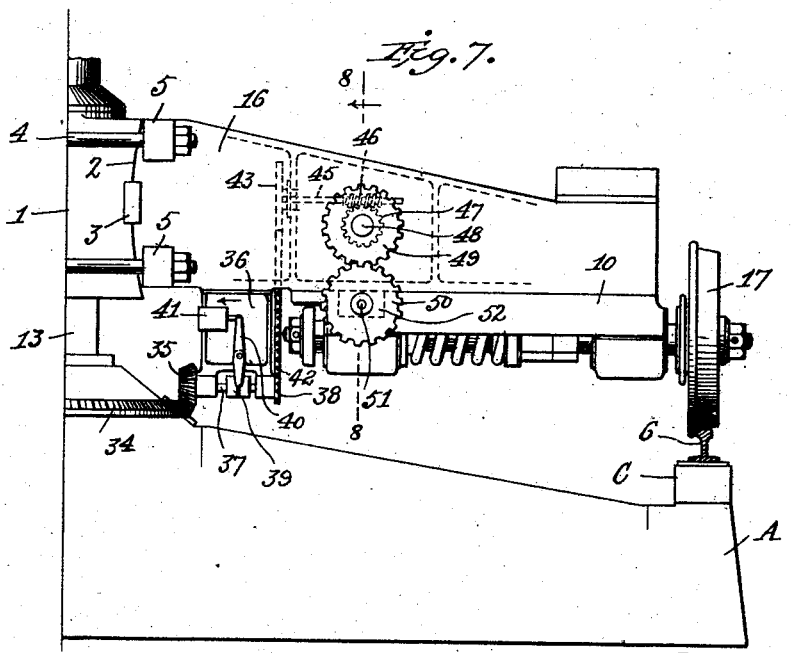

In the accompanying drawings Figure 1 is a partial longitudinal section of a machine embodying my invention. Fig. 2 is a plan view of the supporting arms. Fig. 3 is an end elevation of Fig. 2. Fig. 4 is a detail vertical section of a modified form of saddle-adjusting means. Fig. 5 illustrates locking keys having various degrees of off-sets. Fig. 6 is a side elevation, partly in section, of a modification. Fig. 7 is a similar view of another modification, and Fig. 8 is a section on line 8—8 of Fig. 7, showing one of the adjusting screws.

A designates one of the well known forms of metallic base or frame, and on which are supported, on blocks C or otherwise, the arcuate rail sections 6 to be tested.

Mounted on a central shaft 13 is a hub 1, the outer periphery of which has concaved cylindrical or curved faces 2, and the inner ends of the arms are provided with convex curved faces to fit the faces 2. Said arms are held in place on the hub by keys 3 taking into recesses in both the arms and the hub, and bolts 4 pass through and connect the lugs 5 of the oppositely situated arms. In order to incline the arms I make use of keys 3ª (Fig. 5) having various degrees of offset, each key 3ª serving to produce either an upward or a downward inclination of the arm 16 in accordance with the position in which the key 3ª is inserted in the recesses in the hub and arm. If the keys 3ª are inserted in the recesses shown in Fig. 1 in the position in which they are illustrated in Fig. 5, they will hold the arm inclined downwardly, but if these keys are turned end for end, or reversed, they will incline the arm upwardly from the hub.

On the outer end of each arm 16 is provided a vertical cylindrical housing 8, forming a bearing for a cylindrical boss 9 that forms a part of the wheel mounts. The boss is capable of being rotated in the housing 8 and is held in its rotated position by means of bolts 11, passing through slotted lugs 12 on the arm 16, and a similar lug 15 on a horizontal arm 10 of the wheel mount. After this adjustment keys 14 are inserted between the boss 9 and its housing 8 to prevent the boss 9 from rotating in said bearing. This adjustment permits the car wheel 17 to be placed at an angle to the rail or skewed and held in such angular or skewed position.

The saddles 44 of the auxiliary motors F are of course rotatable to the same degree as the wheel axle mounts, and are held in their rotated position by bolts 18 passing through slots 19 at the sides of the saddle.

In Fig. 6 is illustrated a modification of the above-described means for adjusting the incline of the wheel axle mount during the operation of the machine, and to this end I provide on the arm 16 a depending bearing 21 in which is mounted a short shaft 22 having on one end a sprocket or escapement wheel 23 and on the other end a pinion 24. The pinion 24 meshes with a rack 25 on the horizontal arm 10 of the wheel mount.

Pivotally connected at 26 to one of the struts 7 of the bed is a lever 27 pivotally connected at 28 to a draw rod 29 having notches *a*, *b* and *c* therein, said rod passing through a slot 30 in the bed A and provided with a handle 31. The lever 27 has two escapement teeth or fingers 32, 33, one of which is below the sprocket wheel 23 and the other above. While the draw rod 29 is in the position shown in Fig. 6, and the notch *b* engages the frame A, the lever 27 is in neutral or inoperative position; by lifting the draw-rod 29 and pulling it outward so that the notch *a* engages the bed the lower finger or tooth 32 is brought into the path of the sprocket wheel 23, and at each revolution of the arm 16 a tooth of the sprocket wheel 23 strikes the finger or projection 32, thereby moving said sprocket wheel one tooth, and the arm 10 of the wheel axle mount is moved, through the medium of shaft 22, gear 24 and rack 25 in one direction. By lifting the end 31 and shoving it inward so that the notch *c* engages the bed A, the upper finger 33 is brought into the path of the sprocket wheel 23 and the lower finger 32 simultaneously moved out of its path, whereby said sprocket wheel 33 will, at each revolution of the arm 16, be rotated in a direction opposite to that imparted to it by the finger 32.

In Fig. 7 is illustrated a further modification for shifting the wheel axle mount during the operation of the machine. At the center of the bed A, I provide a miter rack 34, and gearing with this rack is a miter pinion 35 mounted on a shaft 37 journaled in a bearing 36 depending from the arm 16. The shaft 37 carries a sprocket wheel 38 capable of being clutched to said shaft by a clutch sleeve 39 splined on shaft 37 and operated by a lever 40 which is actuated from a compressed air piston and cylinder 41. The sprocket wheel 38 is connected by a chain 42 to a larger sprocket wheel 43 mounted on a shaft 45 having a worm 46 meshing with a worm-wheel 47 mounted on a short shaft 48 which passes through and is mounted in the arm 16. This shaft 48 carries at each end a gear-wheel 49 rigidly connected to said shaft, which gear-wheels in turn mesh with rotatable toothed nuts 50 journaled in lugs 52, depending from the arm 16, as clearly shown in Fig. 8. An adjusting screw 51 projects through each nut 50 and is engaged by internal female screw threads in the latter, and a plate 54 secured to each lug 52 has lug 55 which enters a longitudinal groove 56 in the screw.

By admitting air to the cylinder 41 the lever 40 is moved in the direction of the arrow, causing the clutch sleeve 39 to engage and carry with it the sprocket pinion 38 which in turn rotates, through chain 42 and wheel 43, the shaft 45 and worm 46, thereby rotating the worm-wheel 47, its shaft 48 and the gear wheels 49 secured on the opposite ends of the shaft. These gear wheels simultaneously rotate the toothed nuts 50 on each side of the arm 16 and cause them to move the adjusting screws 51 simultaneously in the same direction and thereby move the arm 10 which is between them. As soon as the proper inclination of the wheels 17 with respect to the rails has been attained, air from the cylinder 41 is released by the operator and the clutch moved to neutral position and the arm 10 of the wheel mount remains in its inclined or rotated position.

In Fig. 4 is shown a section with the boss 9 rotatably mounted in the bearing 8 and secured by key $8^a$ to a collar $9^a$ on which is mounted the saddle $44^a$ so that the latter will be adjusted simultaneously with the wheel mount.

I claim—

1. In a rail testing machine, the combination with a metallic frame for supporting the rails to be tested; of a movable arm extending over the frame, a railway car wheel mount secured to the arm, and means to angularly adjust and hold the mount in its adjusted position with respect to the arm and simultaneously skew the axis of the wheel from its radial line.

2. In a rail testing machine, the combination with a metallic frame for supporting the rails to be tested; of a movable arm extending over the frame, means to permit the vertical adjustment of inclination of the arm, a railway car wheel mount secured to the arm and means to angularly and laterally adjust the mount with respect to the arm.

3. In a rail testing machine, the combination with an arm; of a railway car wheel mount secured to the arm, and means to angularly and positively adjust the mount with respect to the arm during the movement of said arm and hold the mount in its adjusted position.

4. In a rail testing machine, the combination with a circular frame for supporting the rails to be tested, and a vertical central driving shaft; of a hub on the shaft having cylindrical seats, arms having cylindrical ends fitting said seats, removable exchangeable keys between the hub and arm ends having off-sets varying from zero to a maximum to determine the angular adjustment of the arms and means to secure the arms to the hub.

5. In a rail testing machine, the combination with a circular frame for supporting the rails to be tested, and an arm mounted to rotate about the center thereof and having a bearing in its end; of a railway car wheel mount secured to the arm and having a boss mounted in the bearing.

6. In a rail testing machine the combination with a circular frame for supporting the rails to be tested and an arm mounted to rotate about the center thereof and having a bearing in its end; of a railway car wheel mount having a vertical boss thereon mounted in the bearing, means to angularly adjust the boss during the rotation of the arm, a railway car wheel in the mount, an adjustable saddle on the end of the arm, a motor for the car wheel on the saddle, and means to permit the angular adjustment of the saddle and motor with respect to the arm.

7. In a rail testing machine, the combination with a circular frame for supporting rails to be tested and an arm mounted to rotate about the center thereof and having a vertical bearing in its end; of a railway car wheel mount secured to and beneath the arm and having a vertical boss to enter the bearing, a railway car wheel in said mount, means to cause its flange to exert pressure against the rail, a saddle on the end of the arm and means to permit the angular adjustment of the saddle, means to adjust the mount during rotation of the arms and means to permit the vertical angular adjustment of the arm.

8. In a rail testing machine, the combination with a rail supporting frame; of a centrally supported rotatable hub, an arm movable over the frame, and means to permit the change of angularity of the arm with respect to a horizontal and rigidly hold it to the hub in such adjusted position.

9. In a rail testing machine, the combination with a frame for supporting rails to be tested; of an arm traveling over the frame and having a substantially vertical bearing therein, a railway car wheel mount having a boss mounted in the bearing and means to skew the mount with respect to the arm and hold it in its skewed position.

10. In a rail testing machine, the combination with a frame for supporting rails to be tested; of an arm traveling over the frame, a car wheel mount, mounted to swing on the arm and means operable at will to skew the mount with respect to the arm during the movement of said arm and hold it in its skewed position.

11. In a rail testing machine, the combination with an arm; of a railway car wheel mount mounted in the arm and means to produce relative horizontal angular adjustment of the mount with respect to the arm during the movement of said arm and hold it in its adjusted position.

12. In a rail testing machine, the combination with a circular frame for supporting rails to be tested; of an arm rotatable over said frame, a car wheel support mounted to swing on the arm, a rack on the arm, and means to actuate the rack during the movement of the arm and thereby angularly adjust the mount.

13. In a rail testing machine, the combination with a circular frame for supporting rails to be tested; of an arm rotatable over said frame, a car wheel support mounted on said arm, a rack on the support, a pinion mounted on the arm and engaging the rack, an escapement wheel to actuate the gear wheel and an escapement in the path of revolution of said escapement wheel.

14. In a rail testing machine, the combination with a circular frame for supporting rails to be tested; of an arm rotatable over said frame, a car wheel support mounted on said arm, a rack on the support, a pinion mounted on the arm to engage the rack, an escapement wheel to actuate the pinion, an escapement pivoted to the frame, and hand-operated means to move the escapement into the path of said escapement wheel.

15. In a rail testing machine, the combination with a circular frame for supporting rails to be tested; of an arm rotatable over the frame, a car wheel support mounted on the arm, a rack on the support, a pinion engaging the rack and mounted on the arm, an escapement wheel to actuate the pinion, an escapement having two fingers one adapted to engage the escapement wheel at its upper part and the other at its lower part and means to move and hold the fingers in operative position.

In testimony that I claim the foregoing as my invention, I have signed my name in presence of two subscribing witnesses.

PAUL A. CUENOT.

Witnesses:
GEO. W. PARSONS,
WM. C. CUNTZ.